(12) United States Patent
Tessler et al.

(10) Patent No.: US 11,847,682 B2
(45) Date of Patent: Dec. 19, 2023

(54) SYSTEM AND METHOD TO RECOMMEND A SERVICE PROVIDER

(71) Applicant: Capital One Services, LLC, McLean, VA (US)

(72) Inventors: Leeyat Bracha Tessler, Washington, DC (US); Kyle Johnson, Arlington, VA (US); Rocky Guo, Falls Church, VA (US); Elisa-Michelle Rodriguez, Vienna, VA (US); Angelina Wu, Vienna, VA (US); Michael Saia, New York, NY (US); Lin Ni Lisa Cheng, Fresh Meadows, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/876,774

(22) Filed: May 18, 2020

(65) Prior Publication Data

US 2021/0358008 A1 Nov. 18, 2021

(51) Int. Cl.
*G06Q 30/0601* (2023.01)
*G06N 20/00* (2019.01)
(Continued)

(52) U.S. Cl.
CPC .......... *G06Q 30/0631* (2013.01); *G06N 5/04* (2013.01); *G06N 20/00* (2019.01); *G06Q 30/0206* (2013.01); *G06Q 30/0625* (2013.01)

(58) Field of Classification Search
CPC .......... G06Q 30/0631; G06Q 30/0206; G06Q 30/0625; G06N 5/04
(Continued)

(56) References Cited

U.S. PATENT DOCUMENTS 10,430,900 B2 10/2019 Bhattacharjee et al.
2010/0324985 A1* 12/2010 Kumar ............... G06Q 30/0202
706/46
(Continued)

OTHER PUBLICATIONS

Service recommendation with case-based reasoning; Pei Yang; IEEE; 2015 (Year: 2015).*
(Continued)

*Primary Examiner* — Timothy Padot
*Assistant Examiner* — Francis Z. Santiago Merced
(74) *Attorney, Agent, or Firm* — Sterne, Kessler, Goldstein & Fox P.L.L.C.

(57) ABSTRACT

Disclosed herein are system, method, and computer program product embodiments for recommending a service provider. An embodiment operates by receiving a search request specifying a service request by a user and location for the requested service, retrieving prior financial transactions of the user to purchase the service from a database, and determining a preference of the user based on the retrieved prior financial transactions. The embodiment further operates by applying the preference to a model trained to output a recommended service provider and selecting the recommended service provider for display on a user's device. The model more likely recommends service providers in the location having a higher ratio of tip-to-price relative to other providers for the service in the location based on a history of prior financial transactions of a plurality of users.

20 Claims, 5 Drawing Sheets

(51) Int. Cl.
*G06N 5/04* (2023.01)
*G06Q 30/0201* (2023.01)

(58) Field of Classification Search
USPC .......................................................... 705/7.35
See application file for complete search history.

(56) References Cited

U.S. PATENT DOCUMENTS

| | | | |
|---|---|---|---|
| 2011/0218855 A1* | 9/2011 | Cao .................... | G06Q 30/0251 |
| | | | 705/14.49 |
| 2012/0054642 A1* | 3/2012 | Balsiger ................ | G06Q 10/10 |
| | | | 715/752 |
| 2013/0018651 A1* | 1/2013 | Djordjevic ............ | G06Q 10/00 |
| | | | 704/9 |
| 2013/0031001 A1* | 1/2013 | Frechette ........... | G06Q 30/0625 |
| | | | 707/769 |
| 2013/0046634 A1* | 2/2013 | Grigg ..................... | G06Q 30/00 |
| | | | 705/14.58 |
| 2017/0147941 A1* | 5/2017 | Bauer .................... | G06N 20/10 |
| 2019/0139014 A1* | 5/2019 | Carlson ................. | G06Q 20/40 |
| 2019/0188739 A1* | 6/2019 | Champaneria ..... | G06Q 30/0202 |

OTHER PUBLICATIONS

ChuChu Train Productions, "Tip Check—Calculator & Guide", Available from the Internet at https://apps.apple.com/us/app/tip-check-calculator-guide/id430227204, version 1.13.1 released Nov. 25, 2019, pp. 1-2.

Williams, Geoff, "Best Tip Calculator Apps to Download Now", Available from the Internet at https://money.usnews.com/money/personal-finance/spending/articles/best-tip-calculator-apps-to-download-now, Jul. 9, 2019, pp. 1-6.

* cited by examiner

SYSTEM AND METHOD TO RECOMMEND A SERVICE PROVIDER

BACKGROUND

Service providers, such as a haircut store, a massage store, and a manicure store, may provide a service at different levels. Some providers may provide the service at a higher standard and with more content than other providers that provide the same service. Thus, the prices for the same service by different providers may vary from each other. For example, a hair salon may serve a customer with a haircut at a higher price than a barbershop. This is true even for service providers in the same geographic location.

In addition to different base prices, customers may give service providers different tips for the service. Customers typically give tips based on their level of satisfaction. As another example, customers may experience different satisfaction levels for a haircut at different barbershops and tip the barbers at different rates, for example, tipping more for a better haircut.

Sometimes customers need recommendations on service provider or need information on an appropriate tip. Simply conducting an Internet search, even a search on websites such as a YELP or TRIPADVISOR recommendation website, may yield poor results. Many will be irrelevant or will not suit the customer's preferences. Methods and systems are needed to retrieve service provider information and provide recommendations in an improved manner.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
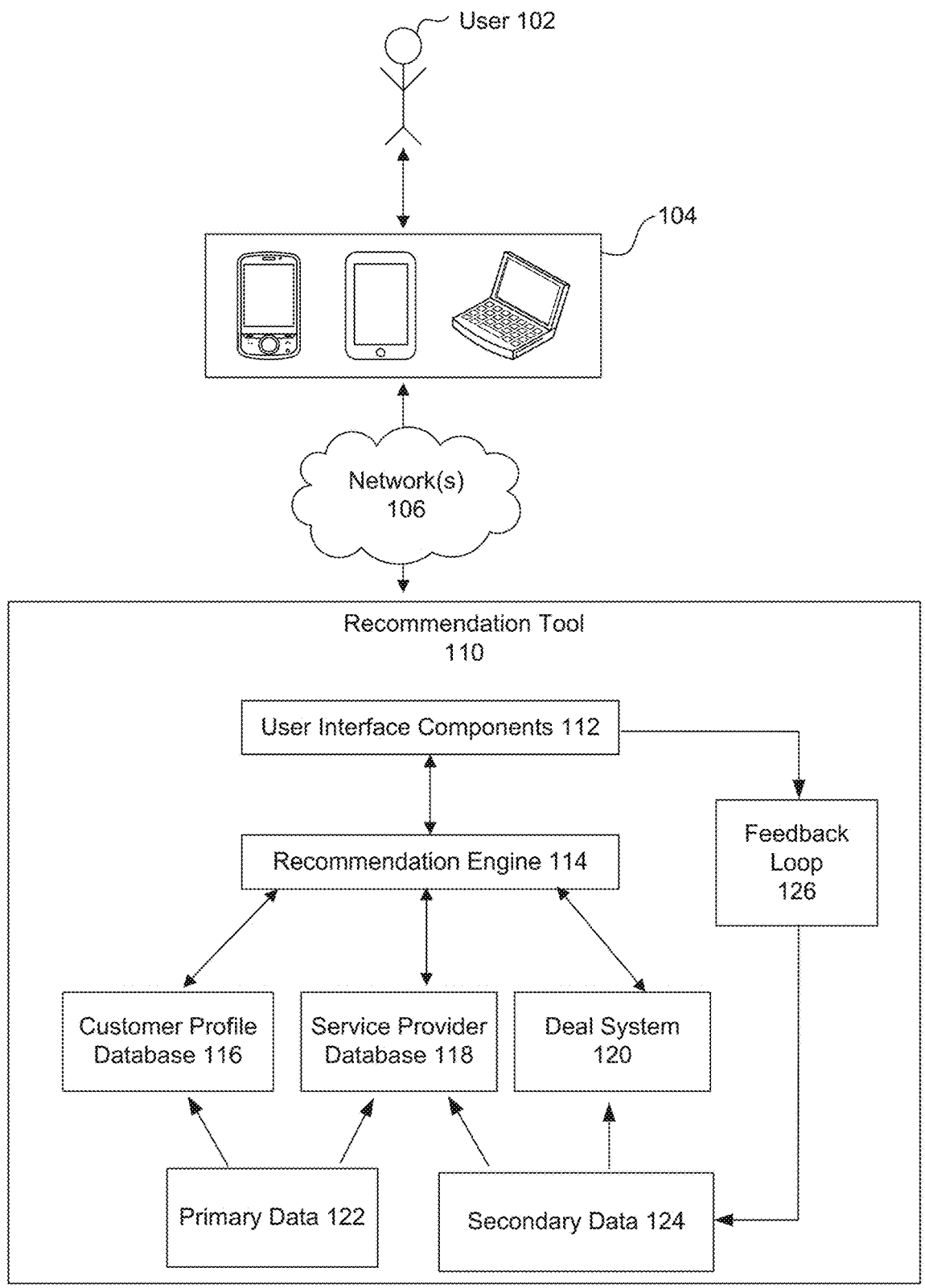
FIG. 1 is a block diagram of an environment to recommend a service provider, according to some embodiments.

Provided herein are system, apparatus, device, method and/or computer program product embodiments, and/or combinations and sub-combinations thereof, for recommending a service provider at a location for a service requested by a user.

A user can request a service from various service providers in a location. The service providers may serve at different quality levels and charge the service for different prices. The user may want to select a service provider based on the preferences and financial situation of the user. In addition, the user may also want to know the tip amount to give to the selected service provider. Conventionally, a user may need to spend a lot of time to find a service provider that can provide a service better than other providers. And, a user may not be sure of the tip amount to give to the service provider. For example, a user may want to have a haircut in a location. For example, a large number of hair salons and barbershops may be located in the user's area. The user may want to find a cheaper store with a better haircut than other stores. However, it may take the user a lot of time to compare the prices of haircut provided by each haircut store in the location and select a haircut store. In addition, the user may not know if the selected haircut store would provide a better haircut than other haircut stores in the location. Moreover, the user may not know how much to tip the barber of the selected haircut store for the haircut.

Various embodiments in accordance with the present disclosure overcome these issues by recommending a service provider to a user based on a preference of the user as well as prices and service levels of the service by the service providers in the location. Prior financial transactions of the user can be retrieved and analyzed to determine the preference of the user. A history of prior financial transactions of the service that the service providers in the location can also be retrieved to determine a typical price and a typical tip of the service for each service provider. The typical price and the typical tip can be determined based on a frequency of the price and the tip of the service. A service level for each service provider can be determined based on a tip-to-price ratio of the service from prior financial transaction data. A higher service level of a service provider can indicate a higher quality level and satisfaction level of the service provided by the service provider. A personalized recommendation of a service provider can be provided to the user based on the preference of the user as well as the prices and the service level of the service by the service provider.

In an example of a haircut request by a user in a location, prior financial transaction data of the user can be retrieved and analyzed. Based on the prior financial transaction data, the user may prefer barbershop rather than a hair salon for a haircut. The history of financial transaction data of haircuts provided by the hair salons and barbershops in the location can also be retrieved and analyzed. The financial transaction data can include an initial charge and an updated charge. A typical price of a haircut can be determined for each store based on the frequency of the initial charge. A tip for the haircut can be determined by a difference between the initial charge and the updated charge. A service level for each store can be determined based on a tip-to-price ratio from prior financial transaction data. A higher service level of a store can indicate a higher satisfaction level of the haircut provided by the store. As a result, a barbershop with a higher service level than other barbershops in the location may be recommended for the user.

FIG. 1 is a block diagram of an environment 100 to recommend a service provider in a location for a service requested by a user, according to some embodiments. Environment 100 may include user 102, computing device 104, network(s) 106, and recommendation tool 110.

User 102 can be an individual customer, a group of customers, or other construct requesting a service in a location. For example, user 102 may be an individual customer requesting a haircut, a manicure, a massage, a meal, or other services. In some embodiments, user 102 may specify a location for the service in the request. In some embodiments, user 102 may use a current location to request the service. In some embodiments, user 102 may request the service via recommendation tool 110 by accessing a stored user account, e.g., using a username/password combination.

Computing device 104 may be a personal digital assistant (PDA), desktop workstation, laptop or notebook computer, netbook, tablet, smart phone, smart watch or other wearable appliance, part of the Internet-of-Things, and/or embedded system, to name a few non-limiting examples, or any combinations thereof. Therefore, it will also be appreciated that any two or more components of environment 100 may similarly be executed using some or all of the one or more computing devices in communication with one another. In some embodiments, computing device 104 may connect to recommendation tool 110 via network(s) 106 including any one or a combination of the Internet, a local area network (LAN), a wide area network (WAN), a wireless network, a cellular network, or various other types of networks as would be appreciated by a person of ordinary skill in the art. In another embodiment, computing device 104 may have software installed thereon that facilitates the behaviors and functions of recommendation tool 110.

Recommendation tool 110 can provide a search interface, via which user 102 may request a service and examine a recommended service provider for the request service. Such a search interface is described in further detail below with reference to FIG. 2. Recommendation tool 110 may be accessed via a web page, an application programming interface (API), or other electronic connections. The entity hosting recommendation tool 110 may be the same as or different from the entity hosting the search interface accessible by user 102. Recommendation tool 110 may also provide a typical price and a recommended tip of the service together with the recommended service provider in the search interface. Recommendation tool 110 may further provide a price range of the service in the location and a map of the service providers with the typical price and the recommended tip. Recommendation tool 110 may include user interface components 112, recommendation engine 114, customer profile database 116, service provider database 118, deal system 120, primary data 122, secondary data 124, and feedback loop 126.

User interface components 112 may be employed by recommendation tool 110 to render a user interface that includes a search interface for viewing by user 102 using computing device 104. User interface components 112 may provide a visual mechanism through which user 102 may request a service and examine a recommended service provider for the request service. User interface components 112 may also provide a price range of the service, a typical price and a recommended tip of the service by the recommended service provider. User interface components 112 may provide additional capabilities to user 102 to further interact with the recommended service provider, for example, changing locations, or locating the recommended service provider in a map. One example of a user interface provided by user interface components 112 is described below with reference to FIG. 2.

Figure 2:
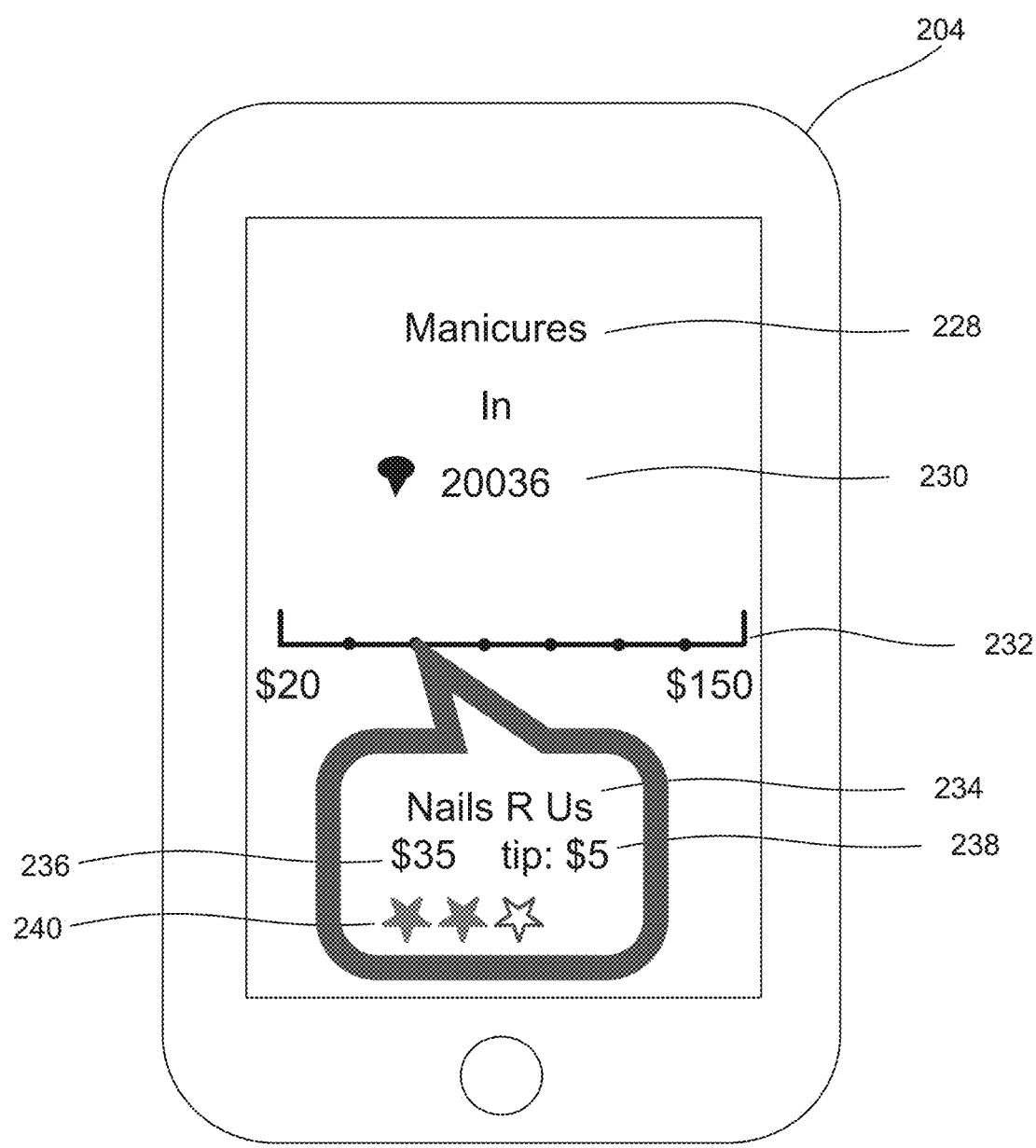
FIG. 2 is an example screen display of a recommended service provider with a typical price, a recommended tip, and a price range for a service in a geo-location, according to some embodiments.

User interface components 112 may include, for example, a JavaScript user interface library to facilitate dynamic interactions between user 102 and recommendation tool 110. User interface components 112 may allow a business or organization to upgrade components used by recommendation tool 110 to improve the experience for user 102 over time. Thus, the look and feel of the particular user interface may change over time, and the screen display displayed in FIG. 2 is merely exemplary.

Recommendation engine 114 may be employed by recommendation tool 110 to determine a recommended service provider and return the recommended service provider to user 102 via a user interface provided by user interface components 112. To determine the recommended service provider, recommendation engine 114 may access customer profile database 116, service provider database 118, and deal system 120 to generate a personalized recommendation for user 102. As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Customer profile database 116 may be one or a plurality of data storage systems housing customer information relevant to, used in, and/or stored by recommendation tool 110. In some embodiments, customer profile database 116 may include preferences of user 102 for various services. In some embodiments, customer profile database 116 may include a spending pattern of user 102 for various services. A spending pattern of a service may include a highest price, a lowest price, an average price, frequencies of different prices that user 102 purchases the service. In some embodiments, customer profile database 116 may include service type, price, and frequency of various services for user 102. In some embodiments, customer profile database 116 may include tipping preferences (e.g., tip-to-price ratios) of various services that user 102 previously purchased. In some embodiments, these customer profile data of user 102 can be employed by recommendation engine 114 and inputted to a model to provide user 102 a personalized recommendation. In some embodiments, the model can include a machine-learning model to recommend a service provider to user 102 in response to a request from user 102. For example, the model can recommend a manicure store with a typical price and a recommended tip, as shown in FIG. 2 and described in details below.

In some embodiments, customer information in customer profile database 116 can be obtained from primary data 122. In some embodiments, primary data 122 can be internal data. In some embodiments, primary data 122 can include prior financial transaction data of various services for user 102 and other users. In some embodiments, the financial transaction data can be obtained from payment terminals of service providers that provide the service to user 102 and other users. They can be obtained in real time with the transactions as the sale transaction is being carried out on a payment terminal at a point of sale. In some embodiments, the financial transaction data can include an initial charge of pre-authorization transaction amount and an updated charge of final transaction amount for a service by a provider. The initial charge can be a price for the service by the provider. A tip can be calculated as a difference between the initial charge and the updated charge. In some embodiments, recommendation engine 114 can determine customer information of user 102, such as a preference on a haircut store or a restaurant, through analyzing prior financial transaction data of user 102 on various services. In some embodiments, recommendation engine 114 can determine tip-to-price ratios of various services purchased by user 102 to determine tipping preferences of user 102 for the various services.

In some embodiments, recommendation engine 114 can provide a personalized recommendation based on the customer information of user 102 obtained from primary data 122 and stored in customer profile database 116. For example, recommendation engine 114 can determine that user 102 may prefer a barbershop instead of a hair salon based on prior financial transaction data of user 102 on haircuts, such as service types, prices, tip-to-price ratios, frequencies, and an average spend of user 102 on previous haircuts. As a result, recommendation engine 114 may recommend a barbershop in response to a haircut request from user 102.

In some embodiments, primary data 122 can further include an available credit of a credit card and an available account balance of a bank account of user 102. In some embodiments, the available credit and available account balance can be obtained from accounts of user 102. In some embodiments, the available credit and the available account balance can be employed by recommendation engine 114 to provide a more personalized recommendation. For example, user 102 may have meals in both fast food restaurants and fine dining restaurants based on the history of prior financial transaction data. In response to a meal request from user 102, recommendation engine 114 may recommend a fast-food restaurant to user 102 based on the customer preference, a low available credit and a low account balance of user 102.

Service provider database 118 may be one or a plurality of data storage systems housing service provider information relevant to, used in, and/or stored by recommendation tool 110. In some embodiments, service provider database 118 may include locations of service providers and services provided by the service providers. In some embodiments, service provider database 118 may include prices, tips, and tip-to-price ratios of the provided services. In some embodiments, service provider database 118 may include frequencies of provided services with respective prices. In some embodiments, service provider information can be employed by recommendation tool 110 and inputted to the machine-learning model to provide user 102 a personalized recommendation of service providers.

In some embodiments, service provider information in service provider database 118 can be obtained from primary data 122 and secondary data 124. In some embodiments, primary data 122 can include prior financial transaction data of various services provided by different service providers. In some embodiments, prices, tips and tip-to-price ratios of various services provided by different service providers can be determined based on initial charges and updated charges in the history of the prior financial transaction data. In some embodiments, a typical price and a typical tip for a service provided by a provider can be determined based on a frequency of the initial charge amount and the tip amount for the service, respectively. For example, a typical price for the service can be a most common initial charge amount (mode), and a typical tip can be a most common tip amount of the service (mode). In other examples, the median or average can be used. In some embodiments, a recommended tip for the service can be determined based on the typical tip for the service and a tipping preference (e.g., tip-to-price ratios of prior financial transactions) of user 102. For example, user 102 may tip manicure services about 10%, for a recommended manicure store with a typical price of $35 and a typical tip of $5, a recommend tip may be adjusted to $5 for user 102.

In some embodiments, a service level of a service provider can be determined based on a tip-to-price ratio of the service from prior financial transaction data. In some embodiments, the service level of a service provider can be determined by comparing tip-to-price ratios of the service provider relative to other service providers. The service level can indicate a quality level of the service and a satisfaction level of users who have purchased the service from the service provider. For example, a higher service level can indicate a higher quality level of the service provider and a higher satisfaction level of users who have purchased the service from the service provider relative to other service providers in the location.

In some embodiments, secondary data 124 can be external data. In some embodiments, secondary data 124 can include review data of the service providers from third-party websites, such as service provider reviews from YELP, TRIPADVISOR, GOOGLE, or other websites. In some embodiments, secondary data 124 can include data related to the service providers from other APIs, such as MASTERCARD API. In some embodiments, secondary data 124 can include data related to the service providers from online resources, such as web scraping. In some embodiments, secondary data 124 can include feedback data related to the service providers from feedback loop 126. In some embodiments, the service level determined by a tip-to-price ratio can be adjusted based on secondary data 124. In some embodiments, for service providers that have no tip information (e.g., cash for tip in a jar) in prior financial transaction data, service provider database 118 can determine the service levels of these service providers based on secondary data 124.

In some embodiments, recommendation engine 114 can provide a personalized recommendation on a service provider for a request service based on the customer information in customer profile database 116 and the service provider information in service provider database 118. For example, recommendation engine 114 can first select a number of barbershops in a location based on the preference of a barbershop instead of a hair salon for user 102. Based on service provider information of the number of barbershops, such as prices, locations, service levels, and frequency of service providers in the history of financial transaction data, recommendation engine 114 can recommend a barbershop having a higher service level than other service providers of the number of barbershops.

Deal system 120 may provide deal information related to the service provided by the service providers, such as a floor price or a deal price for a service provider by a service provider in a location, according to some embodiments. In some embodiments, recommendation engine 114 can provide additional personalized recommendation on service providers using the floor price or the deal price for the service from the service provider. In some embodiments, recommendation engine 114 can send an alert to user 102 about the deal price of the service provider. In some embodiments, user 102 can subscribe to an alert about a deal price of a service. In some embodiments, user 102 can subscribe to alerts that notify user 102 when user 102 is in a location where service providers provided the service at a typical price different from a spending pattern of user 102.

Feedback loop 126 may collect feedback data from user 102, according to some embodiments. For example, feedback data can include whether user 102 purchased services from prior recommended service providers, a satisfaction rating of prior recommended service providers, metadata of financial transactions of the service provided by prior recommended service providers, and other data related to prior recommended service providers. In some embodiments, feedback data from feedback loop 126 can be included in secondary data 124 and analyzed by recommendation engine 114 to update service provider information in service provider database 118.

FIG. 2 is an example screen display 200 of a recommended service provider with a typical price, a recommended tip, and a price range for a service in a location, according to some embodiments. The screen display provided in FIG. 2 is merely exemplary, and one skilled in the relevant art(s) will appreciate that many approaches may be taken to provide a suitable screen display 200 in accordance with this disclosure. According to some embodiments, screen display 200 provides a recommended service provider 234 with a typical price 236 and a recommended tip 238 on a user's device 204 for a service 228 requested by a user in a location 230. Screen display 200 may further include a price range 232 and a service level 240 for service provider 234.

User's device 204 can be similar as computing device 104 described above. In the exemplary embodiment illustrated in FIG. 2, user's device 204 can be a PDA, a smart phone, or a tablet. Service 228 can provide the user the ability to request a service, such as a haircut, a manicure, a message, a restaurant, and other services. In some embodiments, the user can input the requested service on user's device 204 by typing or other available methods. Location 230 can specify a location for the service that the user requests. In some embodiments, the user can input location 230 on user's device 204. In some embodiments, a positioning sensor (such as a GPS or WiFi sensor) of user's device 204 can generate a current for location 230. Price range 232 can list the lowest price and the highest price of the service provided by service providers in location 230. In some embodiments, price range 232 can be determined by recommendation tool 110 based on the history of prior financial transaction data of the service providers in location 230.

Recommended service provider 234 can be displayed on user's device 204 for the requested service 228 in location 230. In some embodiments, typical price 236 and recommended tip 238 for service 228 can be displayed together with recommend service provider 234. In some embodiments, recommended tip 238 can be determined based on the typical tip for the service and a tipping preference (e.g., tip to price ratios of prior financial transactions) of the user. In some embodiments, service level 240 can be displayed to indicate the quality of service 228 provided by recommended service provider 234. In some embodiment, service level 240 can indicate the service quality via stars, for example, two stars out of three or three stars out of five. In some embodiments, recommended service provider 234, typical price 236, recommended tip 238, and service level 240 can be determined by recommendation tool 110 based on preferences of the user and the history of prior financial transaction data of the service providers in location 230 as described above. In some embodiments, a map (not shown in FIG. 2) of service providers in location 230 with respective typical price 236 and recommended tip 238 can be displayed on screen display 200 of user's device 204. In some embodiments, recommendation tool 110 can display an alert (not shown in FIG. 2) about a deal price of service 228 by a service provider on screen display 200 of user's device 204.

In the exemplary embodiment illustrated in FIG. 2, manicures requested by the user in a location with zip code 20036 can have a price range from about $20 to about $150. Nails R Us store can be recommended based on preferences of the user and typical prices of each manicure store in the location. The recommended Nails R Us store can provide a manicure service at a typical price of $35 and the recommended tip for the manicure service is $5. The recommended Nails R Us store can have a service level of two stars out of three.

Figure 3:
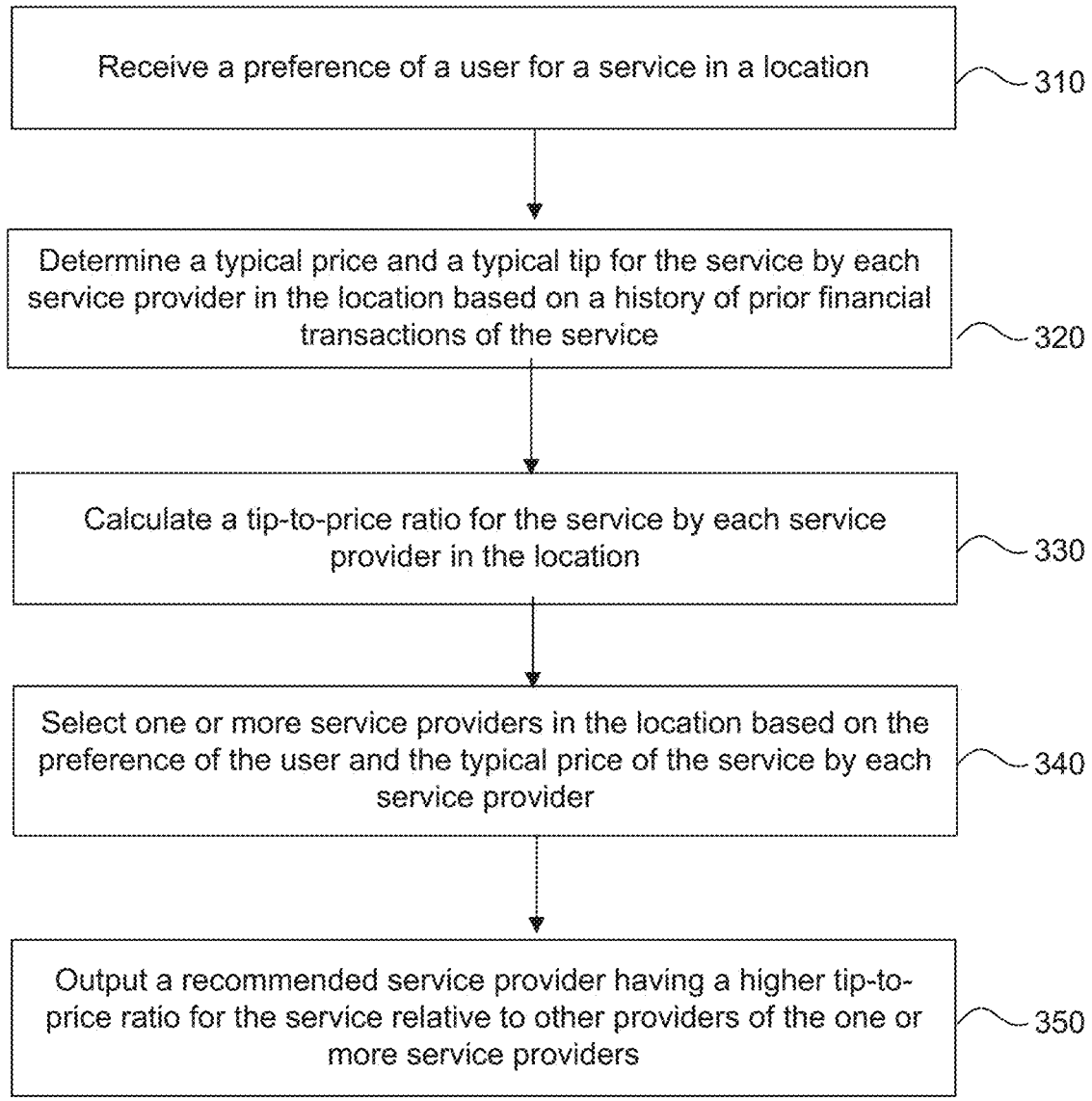
FIG. 3 is a flowchart illustrating a model trained to output a recommended service provider, according to some embodiments.

FIG. 3 is a flowchart 300 illustrating a model trained to output a recommended service provider, according to some embodiments. Flowchart 300 can be performed by processing logic that can comprise hardware (e.g., circuitry, dedicated logic, programmable logic, microcode, etc.), software (e.g., instructions executing on a processing device), or a combination thereof. It is to be appreciated that more or fewer processes may be needed to perform the disclosure provided herein. Further, some of the processes may be performed simultaneously, or in a different order described herein, as will be understood by a person of ordinary skill in the art(s).

In 310, recommendation engine 114 may receive a preference of a user for a service in a location. For example, as shown in FIG. 1, customer profile database 116 can include preferences of the user for the service. Recommendation engine 114 can receive the preferences from customer profile database 116. In some embodiments, the preferences may include spending patterns, spending habits, preferred services and products of the user. In some embodiments, the preferences may include a tipping preference, such as tipping percentages the user usually tips for various services. Recommendation engine 114 can provide personalized recommendation for the user based on the preferences.

In 320, recommendation engine 114 may determine a typical price and a typical tip for the service provided by each search provider in the location based on a history of prior financial transactions of the service. In some embodiments, the history of prior financial transactions of the service can include prior financial transaction data of users who have purchased the service in the service providers. The financial transaction data can include an initial charge of pre-authorization transaction amount and an updated charge of final transaction amount for a service provided by a provider. In some embodiments, recommendation engine 114 can determine service providers in the location that provide the service. Then recommendation engine 114 can determine the typical price and the typical tip based on a frequency of the initial charge amount and the tip amount respectively.

In 330, recommendation engine 114 may calculate a tip-to-price ratio for the service by each service provider in the location. In some embodiments, recommendation engine 114 can calculate the tip-to-price ratio for each service provider based on the prior financial transaction data. In some embodiments, a service level for each service provider can be determined based on the tip-to-price ratio of the service provided by the service provider. In some embodiments, the service level can indicate a quality level of the service and a satisfaction level of users who have purchased the service from the service provider. For example, a higher service level can indicate a higher quality level of the service provider and a higher satisfaction level of users who have purchased the service from the service provider relative to other service providers in the location. The service level and quality level can be determined based the tip-to-price ratio of the service. For example, as shown in FIG. 2, service level 240 can be determined for service provider 234 based on the tip-to-price ratio and displayed on user's device 204.

In 340, recommendation engine 114 can select one or more service providers in the location based on the preference of the use and the typical price of the service provided by each service provider in the location. In some embodiments, recommendation engine 114 can select more than one service provides based on the preference of the user. For example, the user may prefer barbershops instead of hair salons based on prior financial transaction data. Recommendation engine 114 may locate multiple barbershops in the location. In some embodiments, recommendation engine 114 can recommend service providers based on additional customer information of the user, such as an available account balance of the user. As another example, the user may refer both fine dining restaurants and fast food restaurants from the history of prior financial transactions. With a low account balance of the user, recommendation engine 114 may recommend fast food restaurants with lower prices to the user. In some embodiments, recommendation engine 114 can recommend service providers based on additional service provider information, such as a floor price or a deal price of a service provided by a service provider.

In 350, recommendation engine 114 may output a recommended service provider having a higher tip-to-price ratio for the service relative to other providers of the one of more service providers. In some embodiments, recommendation engine 114 can select a recommended service provider based on a higher service level, which can be determined based on the tip-to-price ratio and can indicate the quality level of the service and the satisfaction level of users. For example, as shown in FIG. 2, service provider 234 can be recommended based on typical price 236 and service level 240.

Figure 4:
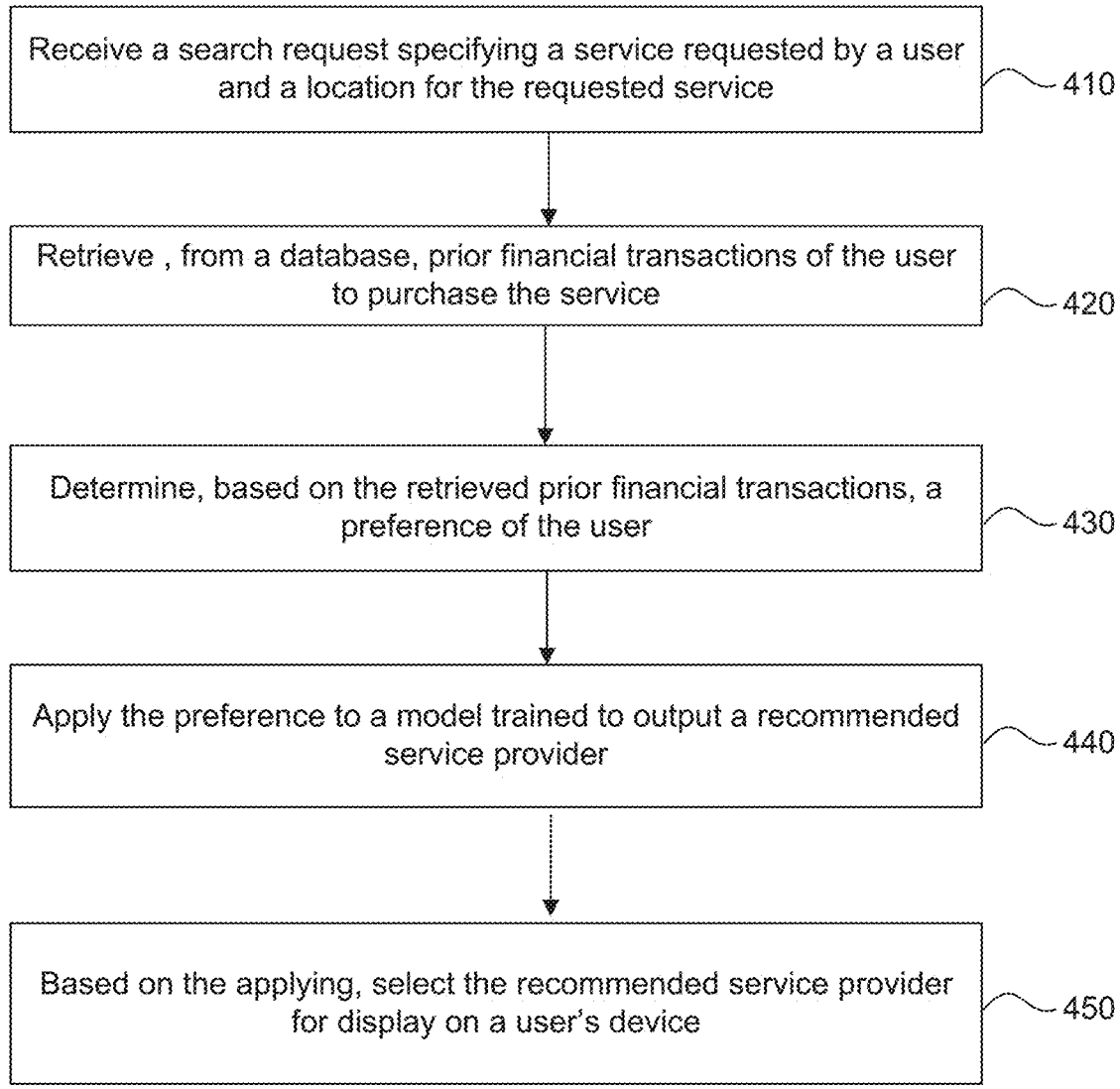
FIG. 4 is a flowchart illustrating a method of providing a personalized recommendation on a service provider, according to some embodiments.

FIG. 4 is a flowchart 400 illustrating a method of providing a personalized recommendation on a service provider, according to some embodiments. Flowchart 400 can be performed by processing logic that can comprise hardware (e.g., circuitry, dedicated logic, programmable logic, microcode, etc.), software (e.g., instructions executing on a processing device), or a combination thereof. It is to be appreciated that more or fewer processes may be needed to perform the disclosure provided herein. Further, some of the processes may be performed simultaneously, or in a different order described herein, as will be understood by a person of ordinary skill in the art(s).

In 410, recommendation tool 110 may receive a search request specifying a service requested by a user and a location for the requested service. For example, as shown in FIG. 2, the user can request a service 228 in a location 230. In some embodiments, the user can input service 228 and location 230 via user's device 204. In some embodiments, a positioning sensor in user's device 204 can locate a current location and the user can use the current location as location 230.

In 420, recommendation tool 110 may retrieve from a database prior financial transactions of the user to purchase the service. For example, as shown in FIG. 1, recommendation tool 110 can retrieve the prior financial transactions of the user who has purchased the service from primary data 122. Primary data 122 can include prior financial transaction data of various services for user 102 and other users.

In 430, recommendation tool 110 may determine a preference of the user based on the retrieved prior financial transactions. For example, as shown in FIG. 1, recommendation tool 110 can determine and store preferences of user 102 and other users in customer profile database 116 based on the retrieved prior financial transaction data from primary data 122.

In 440, recommendation tool 110 can apply the preference to a model trained to output a recommended service provider. For example, the model can be a machine-learning model, or other suitable models, as illustrated in FIG. 3. In some embodiments, the model can take additional information related to the service, such as a deal price of the service provided by a service provider and feedback data of prior recommended service providers for the service. For example, as shown in FIG. 1, recommendation engine 114 can use the model to provide a personalized recommendation based on customer information from customer profile database 116, service provider information from service provider database 118, and deal information from deal system 120.

In 450, recommendation tool 110 can select the recommended service provider for display on a user's device based on the applying. For example, as shown in FIG. 2, recommended service provider 234 can be selected and displayed on user's device 204. In some embodiments, a map (not shown in FIG. 2) of recommended service provider 234 with typical price 236 and recommended tip 238 in location 230 can be displayed on user's device 204. In some embodiments, an alert (not shown in FIG. 2) about a deal price of service 228 by a service provider can be displayed on user's device 204.

Figure 5:
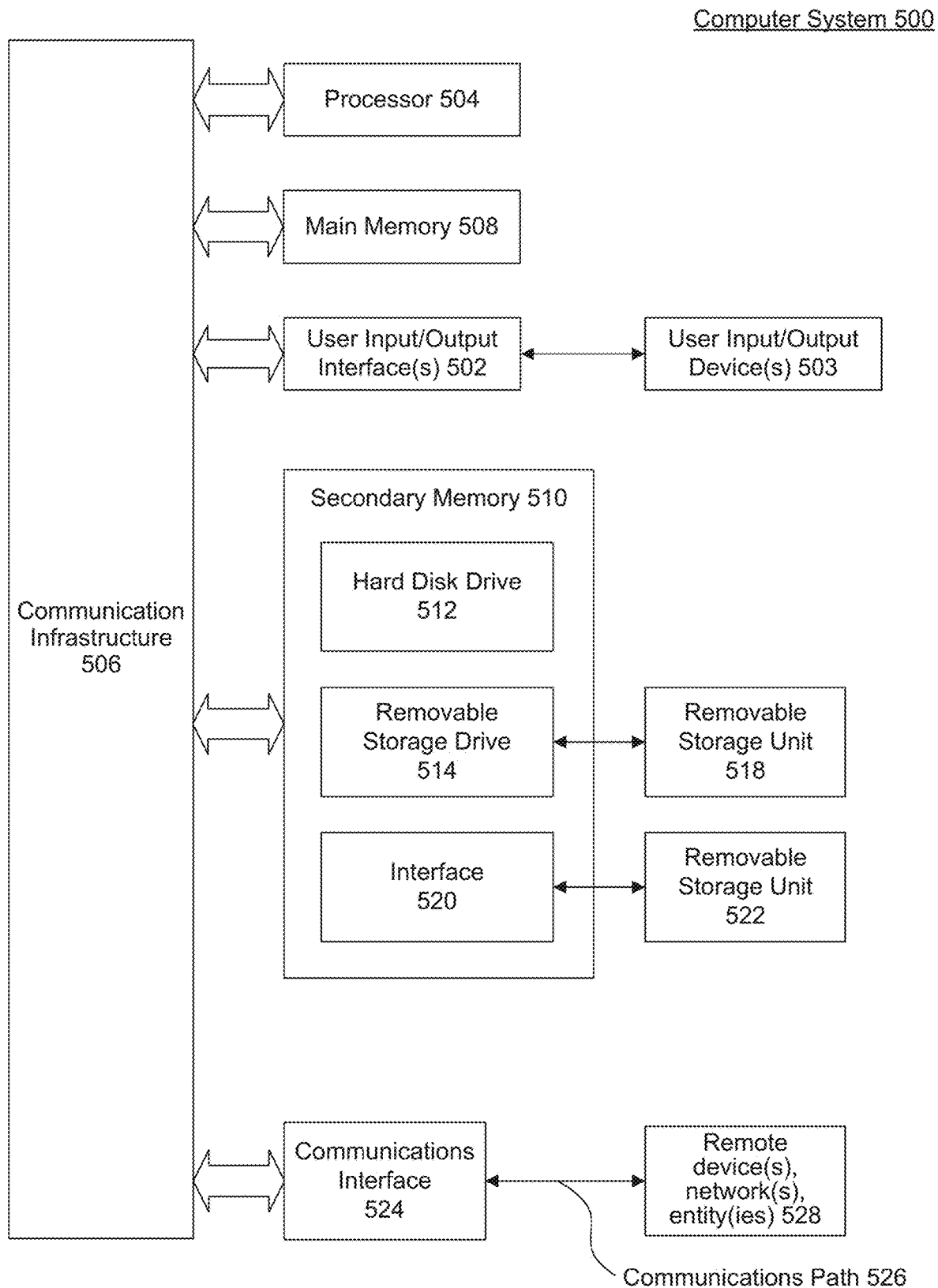
FIG. 5 is an example computer system useful for implementing various embodiments.

Various embodiments may be implemented, for example, using one or more computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communication path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage unit 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for recommending a service provider, comprising:
   obtaining in real time transaction data of a service from payment terminals of a plurality of service providers to store the transaction data in at least one database as a history of prior financial transactions of the service, wherein the transaction data includes an initial charge and an updated charge of the service;
   determining a typical tip and a typical price for the service based on the initial charge and the updated charge of the service;
   training a machine-learning model based on the determined typical tip and typical price for the service to generate a service level for each of the plurality of service providers, wherein the service level is determined by a ratio of the typical tip to the typical price of the service;
   receiving, via a user interface of a user's device, a search request including a service requested by a user and a location specified by the user for the requested service;
   retrieving, from the at least one database, prior financial transactions of the user purchasing the service in the location;
   training the machine-learning model using the prior financial transactions of the user purchasing the service to generate a preference of the user related to the service;
   outputting a recommended service provider based on the service level for each service provider, the preference of the user, and a spending limit of the user, such that the service level of the recommended service provider is higher than the service levels of other service providers in the location, as specified in the history of prior financial transactions of the service;
   providing a visual display of the recommended service provider to the user's device;
   collecting feedback data of the recommended service provider from the user;
   collecting, in real time from payment terminals of the recommended service provider, metadata of financial transactions of the user purchasing the service from the recommended service provider;
   collecting review data of the recommended service provider scraped from third-party websites;
   collecting additional financial transactions of the recommended service provider from external data sources through at least one application programming interface (API); and
   adjusting the service level of the recommended service provider in the machine-learning model using the feedback data from the user, the metadata of financial transactions of the user purchasing the service from the recommended service provider, the review data, and the additional financial transactions.

2. The computer-implemented method of claim 1, wherein the spending limit of the user comprises an available account balance of the user; and wherein the recommended service provider is selected based on the available account balance of the user.

3. The computer-implemented method of claim 1, further comprising, for each of the prior financial transactions of the service:
   calculating a tip for the service in the history of prior financial transactions as a difference between the initial and updated charges.

4. The computer-implemented method of claim 3, further comprising determining the typical price and the typical tip based on a frequency of the initial charge and a frequency of the tip for the service respectively in the history of prior financial transactions of the service.

5. The computer-implemented method of claim 4, further comprising providing for display on the user's device the typical price and a recommended tip for the recommended service provider, wherein the recommended tip is determined based on the preference of the user and the typical tip.

6. The computer-implemented method of claim 1, further comprising:
   determining a price range of the service based on the history of prior financial transactions of the service; and
   providing for display on the user's device the price range.

7. The computer-implemented method of claim 1, wherein receiving the location comprises receiving the location in the search request from the user.

8. The computer-implemented method of claim 1, wherein receiving the location comprises receiving the location generated by a positioning sensor of the user's device.

9. The computer-implemented method of claim 1, further comprising providing for display on the user's device a map of the service providers in the location with respective typical price of the service in the location.

10. The computer-implemented method of claim 1, further comprising providing for display an alert related to the service in the location.

11. A system, comprising:
    a memory; and
    at least one processor coupled to the memory and configured to:
       obtain in real time transaction data of a service from payment terminals of a plurality of service providers to store the transaction data in at least one database as a history of prior financial transactions of the service, wherein the transaction data includes an initial charge and an updated charge of the service;
       determine a typical tip and a typical price for the service based on the initial charge and the updated charge of the service;
       train a machine-learning model based on the determined typical tip and typical price for the service to generate a service level for each of the plurality of service providers, wherein the service level is determined by a ratio of the typical tip to the typical price of the service;
       receive, via a user interface of a user's device, a search request including a service requested by a user and a location specified by the user for the requested service;
       retrieve, from the at least one database, prior financial transactions of the user purchasing the service;
       train the machine-learning model using the prior financial transactions of the user purchasing the service to generate a preference of the user related to the service;
       output a recommended service provider based on the service level for each service provider, the preference of the user, and a spending limit of the user, such that the service level of the recommended service provider is higher than the service levels of other service providers in the location, as specified in the history of prior financial transactions of the service;
       provide a visual display of the recommended service provider to the user's device;
       collect feedback data of the recommended service provider from the user;

collect, in real time from payment terminals of the recommended service provider, metadata of financial transactions of the user purchasing the service from the recommended service provider;

collect review data of the recommended service provider scraped from third-party websites;

collect additional financial transactions of the recommended service provider from external data sources through at least one application programming interface (API); and adjust the service level of the recommended service provider in the machine-learning model using the feedback data from the user, the metadata of financial transactions of the user purchasing the service, the review data, and the additional financial transactions.

12. The system of claim 11, wherein the spending limit of the user comprises an available account balance of the user; and wherein the recommended service provider is selected based on the available account balance of the user.

13. The system of claim 11, wherein the at least one processor is further configured to, for each of the prior financial transactions of the service:

calculate a tip for the service in the history of prior financial transaction as a difference between the initial and updated charges.

14. The system of claim 13, wherein the at least one processor is further configured to determine the typical price and the typical tip based on a frequency of the initial charge and a frequency of the tip for the service respectively in the history of prior financial transactions of the service.

15. The system of claim 14, wherein the at least one processor is further configured to provide for display on the user's device the typical price and a recommended tip for the recommended service provider, wherein the recommended tip is determined based on the preference of the user and the typical tip.

16. The system of claim 11, wherein the at least one processor is further configured to:

determine a price range of the service based on the history of prior financial transactions of the service; and provide for display on the user's device the price range.

17. The system of claim 11, wherein receiving the location comprises receiving the location in the search request from the user and receiving the location generated by a positioning sensor of the user's device.

18. A non-transitory computer-readable device having instructions stored thereon that, when executed by at least one computing device, cause the at least one computing device to perform operations comprising:

obtaining in real time transaction data of a service from payment terminals of a plurality of service providers to store the transaction data in at least one database as a history of prior financial transactions of the service, wherein the transaction data includes an initial charge and an updated charge of the service;

determining a typical tip and a typical price for the service based on the initial charge and the updated charge of the service;

training a machine-learning model based on the determined typical tip and typical price for the service to generate a service level for each of the plurality of service providers, wherein the service level is determined by a ratio of the typical tip to the typical price of the service;

receiving, via a user interface of a user's device, a search request including a service requested by a user and a location specified by the user for the requested service;

retrieving, from the at least one database, prior financial transactions of the user purchasing the service;

training the machine-learning model using the prior financial transactions of the user purchasing the service to generate a preference of the user related to the service;

outputting a recommended service provider based on the service level for each service provider, the preference of the user, and a spending limit of the user, such that the service level of the recommended service provider is higher than the service levels of other service providers in the location, as specified in the history of prior financial transactions of the service;

providing a visual display of the recommended service provider to the user's device;

collecting feedback data of the recommended service provider from the user;

collecting, in real time from payment terminals of the recommended service provider, metadata of financial transactions of the user purchasing the service from the recommended service provider;

collecting review data of the recommended service provider extracted from third-party websites;

collecting additional financial transactions of the recommended service provider from external data sources through at least one application programming interface (API); and adjusting the service level of the recommended service provider in the machine-learning model using the feedback data from the user, the metadata of financial transactions of the user purchasing the service, the review data, and the additional financial transactions.

19. The non-transitory computer-readable device of claim 18, wherein the spending limit of the user comprises an available account balance of the user; and wherein the recommended service provider is selected based on the available account balance of the user.

20. The non-transitory computer-readable device of claim 19, wherein the at least one computing device performs further operations comprising, for each of the prior financial transactions of the service:

calculating a tip for the service in the history of prior financial transactions as a difference between the initial and updated charges.

* * * * *